(12) United States Patent
Fujinaga (10) Patent No.: US 7,395,338 B2
(45) Date of Patent: Jul. 1, 2008

(54) INFORMATION PROCESSING APPARATUS AND SESSION MANAGEMENT METHOD

(75) Inventor: Kohji Fujinaga, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 848 days.

(21) Appl. No.: 10/823,565

(22) Filed: Apr. 14, 2004

(65) Prior Publication Data

US 2005/0021775 A1    Jan. 27, 2005

(30) Foreign Application Priority Data

Apr. 15, 2003    (JP)    ............................. 2003-110540

(51) Int. Cl.
  *G06F 15/16*    (2006.01)
(52) U.S. Cl. ...................... 709/228; 709/203; 709/217; 709/219; 709/237
(58) Field of Classification Search ................ 709/203, 709/217, 227, 228, 237, 219
  See application file for complete search history.

(56) References Cited

U.S. PATENT DOCUMENTS

| | | | | | |
|---|---|---|---|---|---|
| 5,774,670 | A | * | 6/1998 | Montulli | ..................... 709/227 |
| 5,961,601 | A | * | 10/1999 | Iyengar | ....................... 709/229 |
| 6,070,185 | A | * | 5/2000 | Anupam et al. | ............. 709/204 |
| 6,085,224 | A | * | 7/2000 | Wagner | ....................... 709/203 |
| 6,460,079 | B1 | * | 10/2002 | Blumenau | .................... 709/223 |
| 6,751,654 | B2 | * | 6/2004 | Massarani et al. | ........... 709/219 |
| 6,785,705 | B1 | * | 8/2004 | Kocherlakota | ............... 709/203 |
| 6,910,180 | B1 | * | 6/2005 | Cui et al. | ..................... 715/513 |
| 6,928,440 | B2 | * | 8/2005 | Cordray et al. | ................ 707/9 |
| 7,003,565 | B2 | * | 2/2006 | Hind et al. | .................. 709/224 |
| 7,010,605 | B1 | * | 3/2006 | Dharmarajan | ............... 709/227 |
| 7,058,718 | B2 | * | 6/2006 | Fontes et al. | ................ 709/228 |
| 7,164,685 | B2 | * | 1/2007 | Atamaniouk | ................ 370/401 |
| 2002/0122203 | A1 | | 9/2002 | Matsuda | |

FOREIGN PATENT DOCUMENTS

| | | |
|---|---|---|
| JP | 2002-32545 | 1/2002 |
| JP | 2002-359718 | 12/2002 |
| JP | 2002-373255 | 12/2002 |
| WO | WO 03/017123 A1 | 2/2003 |

* cited by examiner

*Primary Examiner*—Michael Won
(74) *Attorney, Agent, or Firm*—Oblon, Spivak, McClelland, Maier & Neustadt, P.C.

(57) ABSTRACT

An information processing apparatus is provided, in which information processing apparatus communicates with a terminal connected to a network by using an HTTP protocol and performs processes requested by the terminal, and the information processing apparatus includes: a cookie information setting part for setting a predetermined string, as cookie information, in an HTTP response corresponding to a first HTTP request sent from the terminal; and a cookie information determining part for determining whether a second HTTP request includes the predetermined string as cookie information, wherein the second HTTP request is sent from the terminal after the first HTTP request is sent and indicates a start of a session between the terminal and the information processing apparatus.

8 Claims, 12 Drawing Sheets

| SESSION ID | DATA OF WEB APPLICATION |
|---|---|
| 001 | ······ |
| 002 | ······ |
| 003 | ······ |
| 004 | ······ |
| : | : |

FIG.12

INFORMATION PROCESSING APPARATUS AND SESSION MANAGEMENT METHOD

BACKGROUND OF THE INVENTION

1. Field of the Invention

The present invention relates to an information processing apparatus and a session management method. More particularly, the present invention relates to an information processing apparatus for communicating with a terminal connected via a network by using an HTTP protocol, and a session management method used in the information processing apparatus.

2. Description of the Related Art

As Web technology became more advanced recently, users can use various services via a Web page displayed on a Web browser. Communications between a Web server that provides the Web page and a client including the Web browser are generally performed by an HTTP (Hypertext Transfer Protocol)

The HTTP protocol is a session-less protocol in which communications between the Web server and the client end after an HTTP response is transmitted in response to an HTTP request. Therefore, a mechanism for keeping continuity of the session is necessary in a Web application that provides the Web page. There are several methods for keeping the continuity of the session: a method for using "cookie" function, a method for including an ID in a URL for managing the session uniquely, and a method for embedding an ID for managing the session in HTML data (Web page) and the like.

Figure 1:
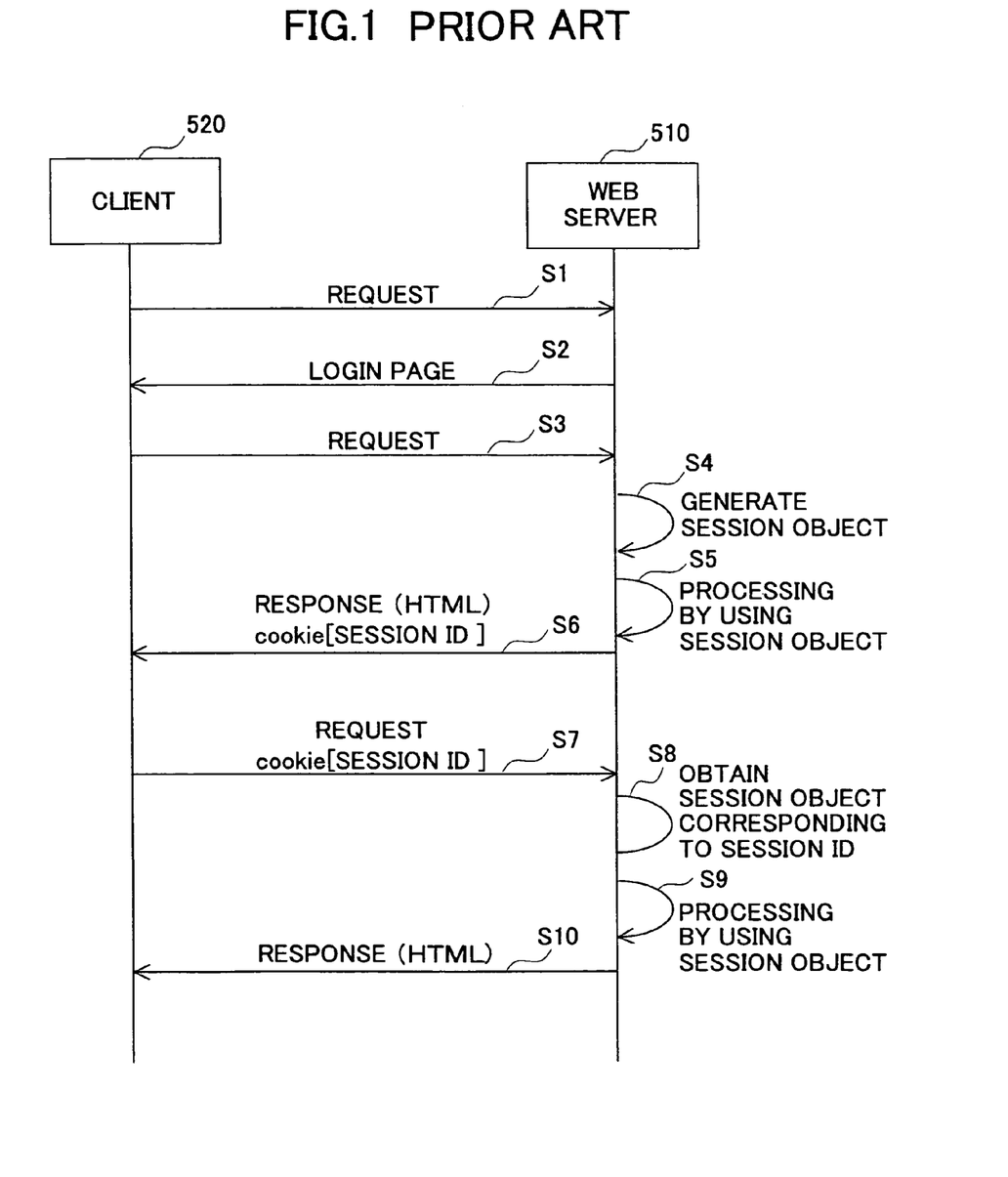
FIG. 1 is a sequence chart for explaining a method for performing session management by using a cookie function.

In these methods, the method for using the cookie function is realized by processes shown in FIG. 1, for example. FIG. 1 is a sequence chart for explaining the method for performing session management by using the cookie function.

The client 520 sends, to a Web server 510, an HTTP request (to be referred to as "request" hereinafter) for requesting use of a predetermined service in step S1. Then, the Web server 510 sends, to the client 520, a Web page (to be referred to as "login page" hereinafter) for the user to input a user ID and a password in step S2.

After the user name and the password are input on the login page, the client 520 sends a request to the Web server 520 to log in to the Web server 520 in step S3. Then, the Web server 510 performs user authentication and the like, and generates a session object for managing information on the session for the client 520 in step S4 (start of session), and starts processes using the session object in step S5. The Web server 510 sends an HTTP response to the client 520 in which the HTTP response includes cookie information including the session ID and the Web page for providing the predetermined service. Then, the client 520 stores the session ID included in the cookie information in step S6.

After that, since any request sent from the client includes the session ID in the cookie information (step S7), the Web server 510 can continue the session between the client and the Web server 510 by using the session object already generated (steps S8-S10).

However, the above-mentioned method using the cookie function can be used only when the cookie function is enabled in the Web browser used in the client 520. Recently, many users set the cookie function disabled from the point of view of security.

When the cookie function is set to be disabled in the Web browser, the session ID sent from the Web server as cookie information is not stored in the client 520. Therefore, any request sent from the client after that does not include any session ID. Therefore, the Web server determines that any session is not started yet for the client so that the Web server performs initial processes to start a session.

Figure 2:
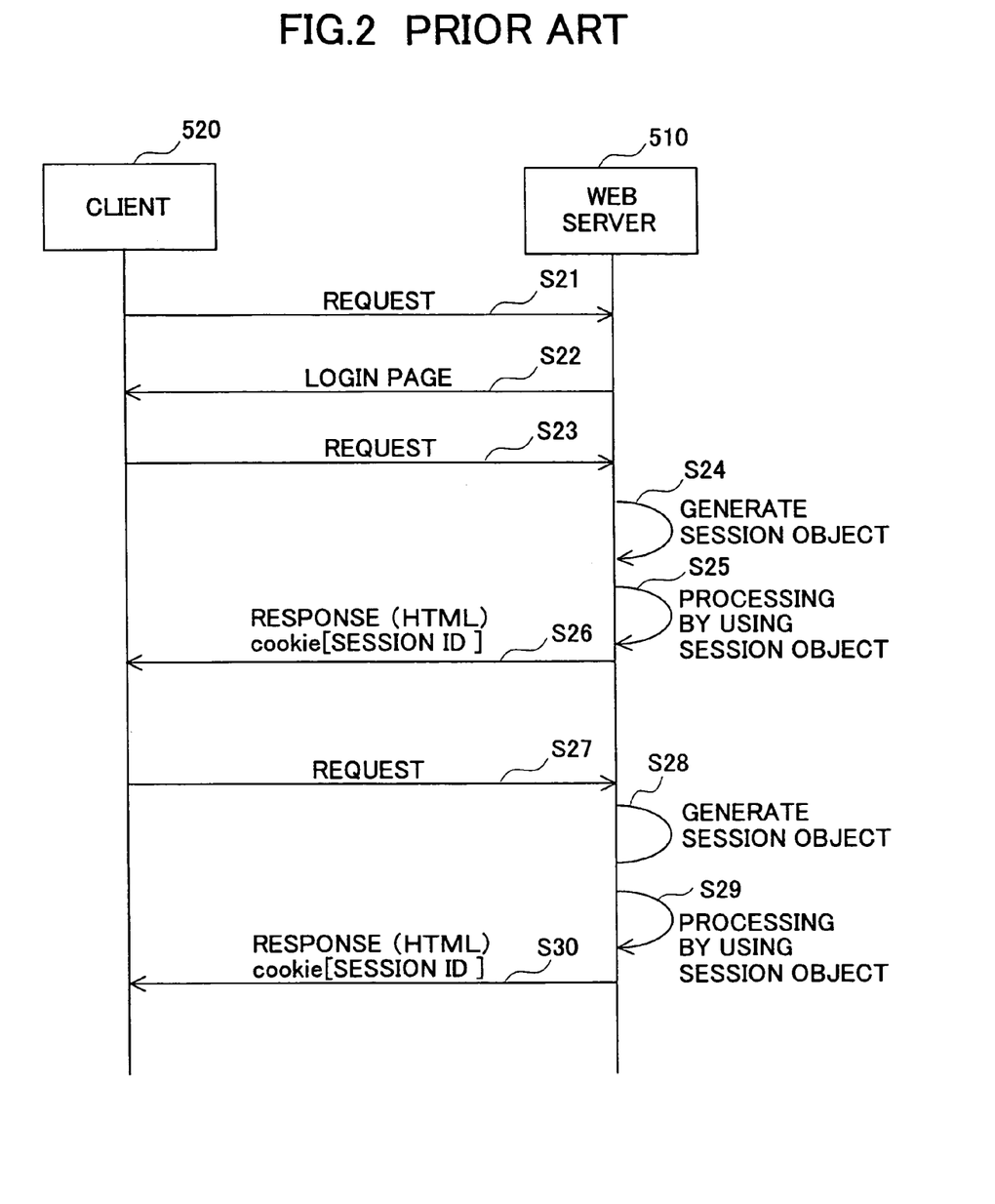
FIG. 2 is a sequence chart for explaining a case where the cookie function is set disabled in the client.

The above-mentioned case is described with reference to figures. FIG. 2 is a sequence chart for explaining a case where the cookie function is set disabled in the client.

In FIG. 2, the processes from the step S21 to step S26 are the same as those of steps S1-S6 of FIG. 1. That is, a session for the client 520 starts in step S24, and a response in which a session ID is included in cookie information is sent to the client 520 from the Web server 510.

However, in FIG. 2, since the cookie function is disabled in the client 520, the session ID is not stored in the client 520.

Therefore, any request sent from the client 520 to the Web server 510 hereinafter does not include any session ID (step S27). As a result, although the Web server 510 generates a session object for the client 520 in step S24, the Web server 510 generates a session object again in step S28. For generating a session object, it is necessary to keep a certain amount of memory area. Therefore, there is a possibility in that the Web server 510 uses up all memory areas if the Web server 510 continues to generate the session object repeatedly for the same client, so that the system down may occur.

SUMMARY OF THE INVENTION

An object of the present invention is to provide an information processing apparatus that can determine whether the cookie function is enabled or not in the client when starting a session for a client.

The above-mentioned object is achieved by an information processing apparatus that communicates with a terminal connected to a network by using an HTTP protocol and performs processes requested by the terminal, the information processing apparatus including; a cookie information setting part for setting a predetermined string, as cookie information, in an HTTP response corresponding to a first HTTP request sent from the terminal; and a cookie information determining part for determining whether a second HTTP request includes the predetermined string as cookie information, wherein the second HTTP request is sent from the terminal after the first HTTP request is sent and indicates a start of a session between the terminal and the information processing apparatus.

According to the information processing apparatus, the information processing apparatus sends the predetermined string to the terminal as cookie information in response to the first HTTP request that is sent before the second HTTP request that indicates a start of a session. Thus, when the information processing apparatus receives the second HTTP request, that is, when a session is started, the information processing apparatus determines whether the predetermine string is included in the second HTTP request, so that the information processing apparatus can determine whether a cookie function is enabled or not in the terminal.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 3:
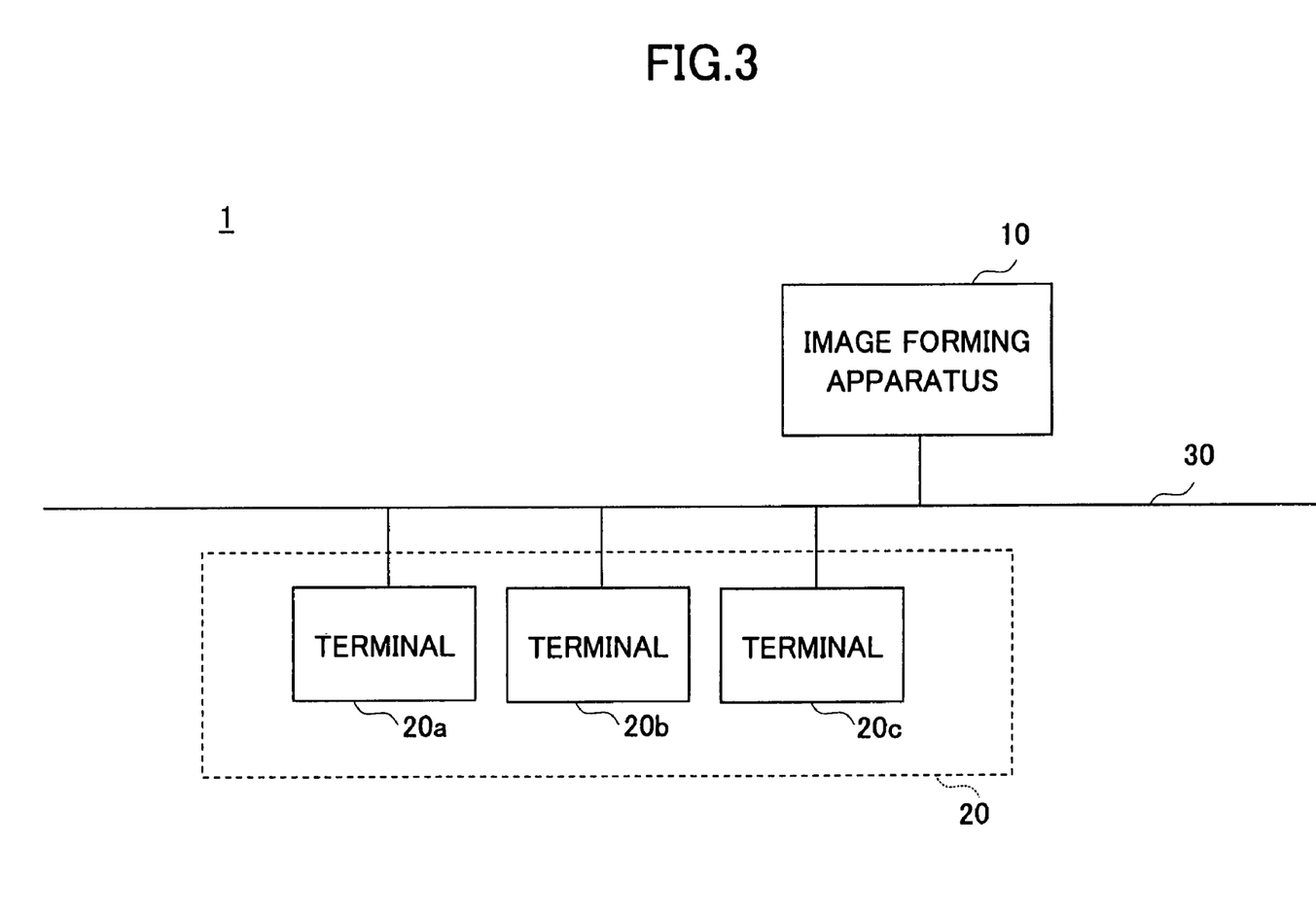
FIG. 3 is a block diagram of an image processing system according to an embodiment of the present invention.

In the following, embodiments of the present invention are described with reference to figures. In the embodiments, an image forming apparatus is described as an example of an information processing apparatus. FIG. 3 is a block diagram of an image processing system according to an embodiment of the present invention. The image processing system 1 of FIG. 3 includes an image forming apparatus 10, a terminal 20a, a terminal 20b, and a terminal 20c (the terminals are collectively called "terminal 20" hereinafter) that are connected to a network 30 such as an intranet or the Internet and the like.

The image forming apparatus 10 prints document data and sends a facsimile, for example, in response to a request from the terminal 20. In addition, the image forming apparatus 10 has a function of a Web server, so that when the image forming apparatus 10 receives a request for sending various information on the image forming apparatus 10 from the terminal 20, the image forming apparatus 10 returns a Web page for displaying requested information to the terminal 20.

Figure 4:
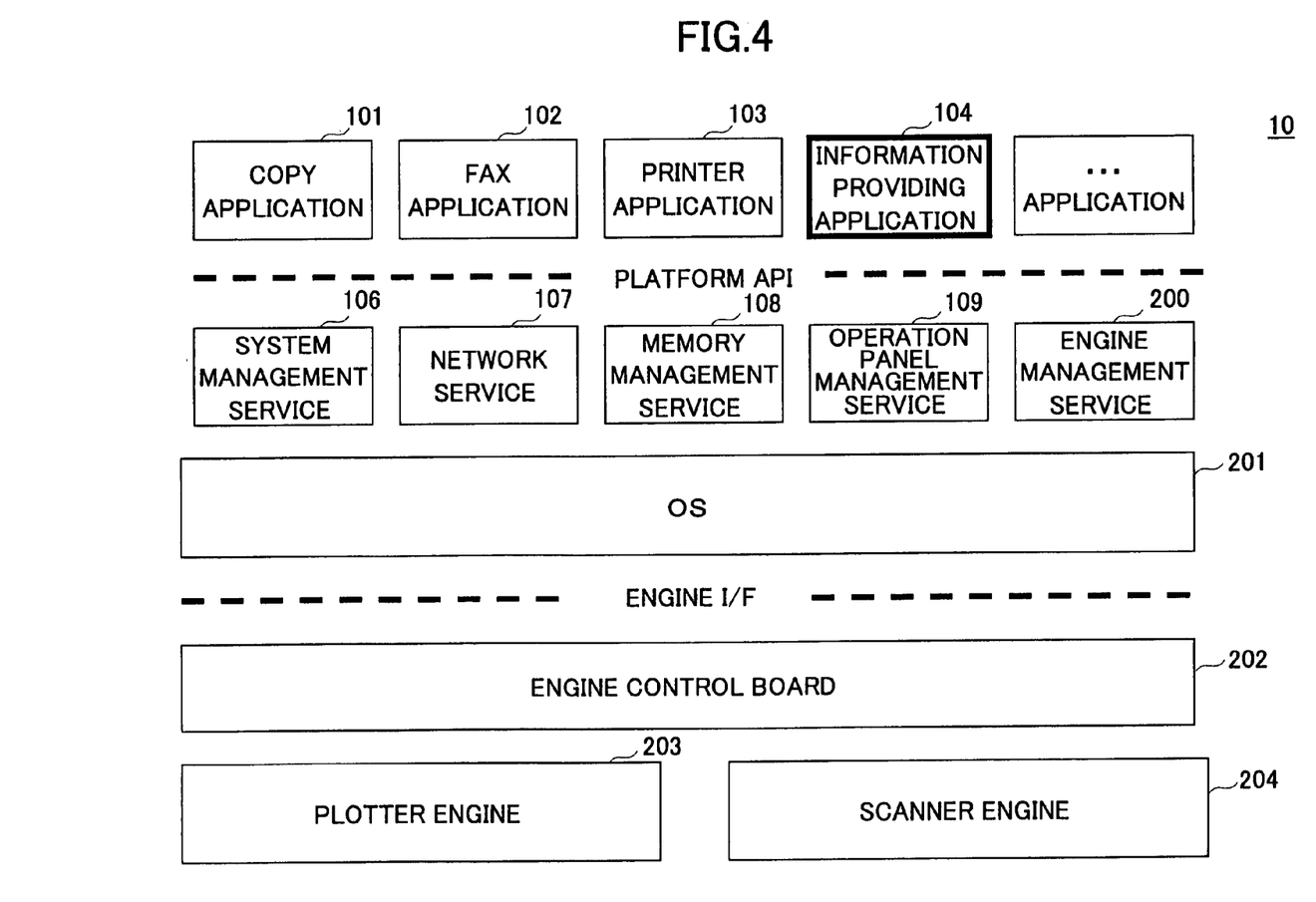
FIG. 4 is a block diagram of the image forming apparatus showing a functional configuration example according to the embodiment of the present invention.

FIG. 4 is a block diagram of the image forming apparatus showing a functional configuration example according to the embodiment of the present invention. In FIG. 4, the image forming apparatus 10 includes hardware resources for performing image processing such as a plotter engine 203 and a scanner engine 204 and the like, an engine control board 202, an OS 201, a system management service 106, a network service 107, a memory management service 108, an operation panel management service 109, an engine management service 200, and various applications. The applications include a copy application 101, a fax application 102, a printer application 103 and an information providing application 104 and the like.

The engine control board 202 controls each function of the image forming apparatus 10 such as the plotter engine 203 and the scanner engine 204 and the like. In addition, the engine control board 202 provides the functions of the engine control board 202 to the OS 201 and the like via the engine I/F (interface).

The OS 201 is an operating system such as the UNIX, and executes various application software, in parallel as processes, such as the copy application 101 and the fax application 102 and the like.

Each of the system management service 106, the network service 107, the memory management service 108, the operation panel management service 109 and the engine control service 200 provides its functions to upper applications such as the copy application 101 and the like via APIs (Application Programming Interfaces). That is, the system management service 106 provides functions for system management. The network service 107 provides functions for network communications. The memory management service 108 provides functions for memory management. The operation panel management service 109 provides functions on the operation panel of the image forming apparatus 10. The engine management service 200 provides functions for controlling the plotter engine 203 and the scanner engine 204 via the engine control board 202.

The copy application 101 is an application for copy, and the fax application 102 is an application for facsimile. The printer application 102 is an application for printing including page description language (PDL), PCL and post script (PS). The information providing application 104 performs processes for generating a Web page for displaying information requested from the terminal 20.

Figure 5:
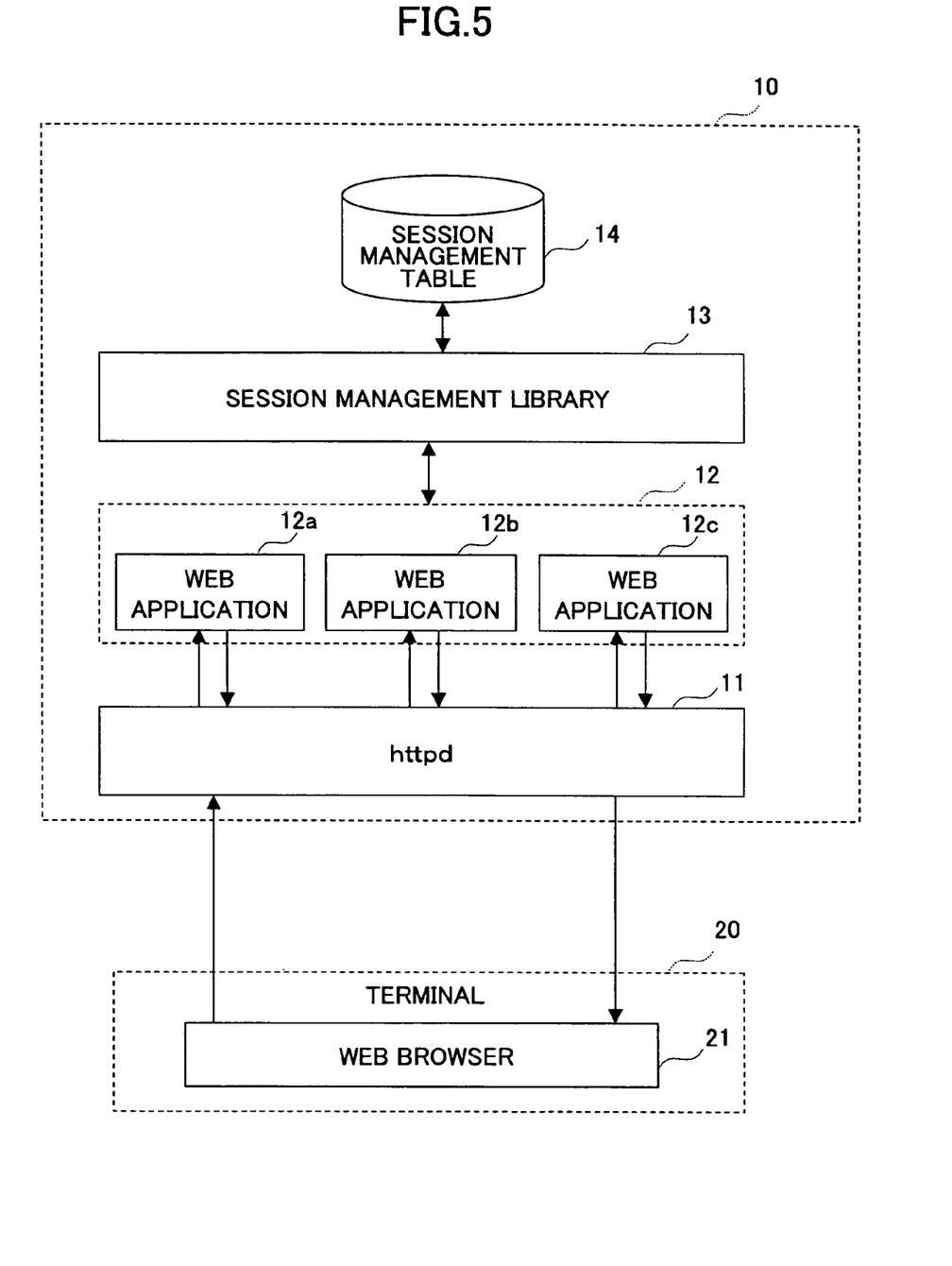
FIG. 5 shows a functional configuration example of the image forming apparatus for operating the image forming apparatus as a Web server.

In FIG. 4, the information providing application 104 and the network service 107 realize functions of the Web server in the image forming apparatus 10. FIG. 5 shows an example of a functional configuration example of the image forming apparatus 10 for operating the image forming apparatus as a Web server. That is, FIG. 5 shows a detailed configuration realized by the network service 107 and the information providing application 104 in FIG. 4.

As shown in FIG. 5, the function of the Web server in the image forming apparatus 10 includes a httpd 11, Web applications 12a, 12b and 12c (collectively called "Web applications 12"), a session management library 13 and a session management table 14.

The httpd 11 is a daemon program for controlling communications between the terminal 20 and the image forming apparatus 10 by using an HTTP protocol. The Web applications 12 are modules for performing processes corresponding to an HTTP request sent from the terminal 20, and includes a plurality of Web applications such as the Web applications 12a, 12b and 12c according to each function. The session management library 13 is a function group for performing processes for keeping continuity of a session (a series of sequences between the terminal 20 and the image forming apparatus 10). The session management table 14 is a table for managing information on the session.

The terminal 20 includes a Web browser 21 for requesting the image forming apparatus 10 to send a Web page, and displaying the Web page sent from the image forming apparatus 10 according to the request.

Figure 6:
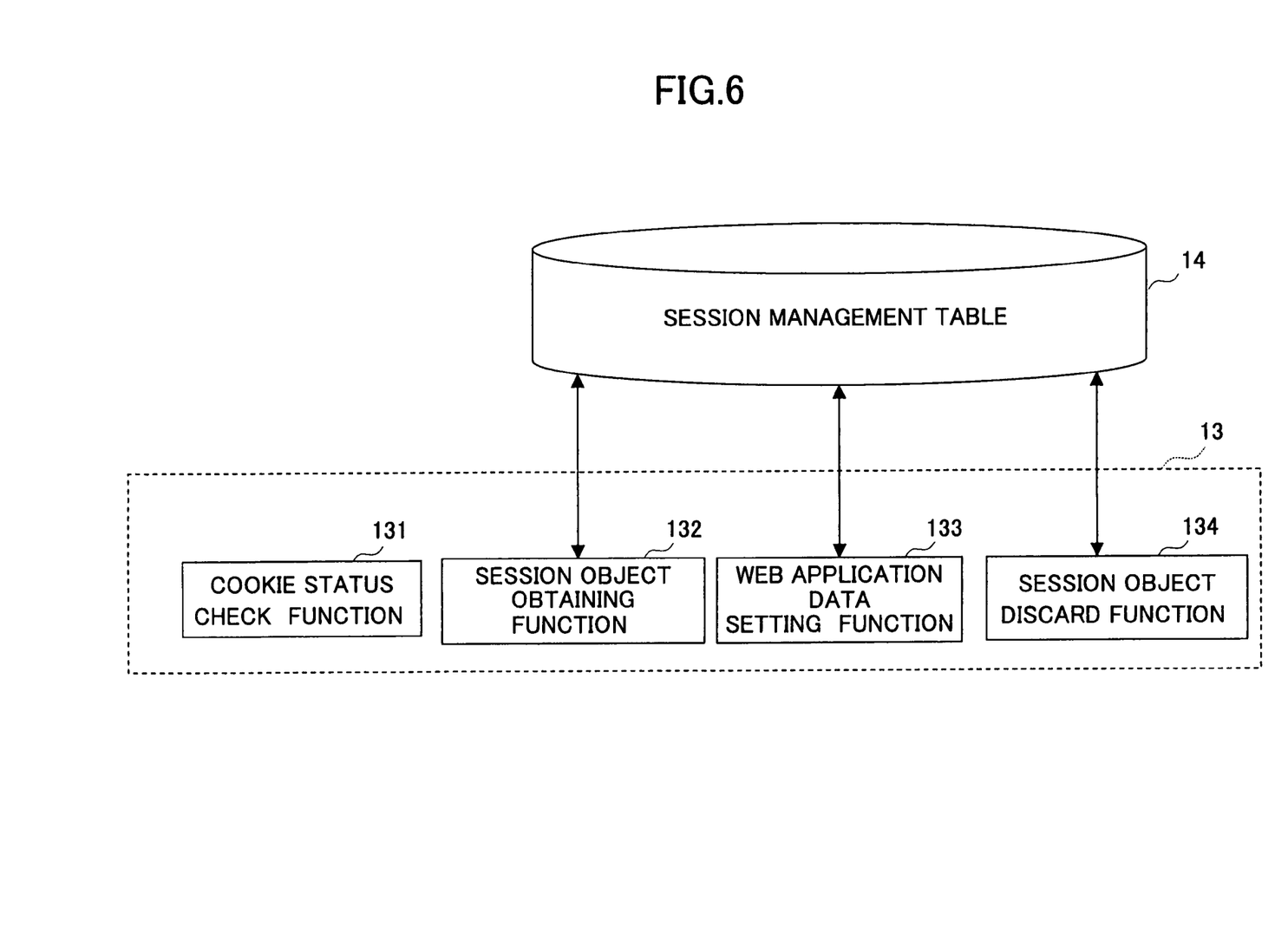
FIG. 6 shows a functional configuration example of a session management library.

Next, the session management library 13 is described. FIG. 6 shows a functional configuration example of the session management library 13. As shown in FIG. 6, the session management library 13 includes a cookie status check function 131, a session object obtaining function 132, a Web application data setting function 133, and a session object discard function 134 and the like.

The cookie status check function 131 determines whether the cookie function is enabled or disabled in the terminal 20 on the basis of an HTTP request from the terminal 20. The session object obtaining function 132 generates or obtains a session object. The Web application data setting function 133 is a function for setting data designated by an argument into the session object. The session object discard function 134 is a function for discarding of the session object, that is, for clearing memory area.

In the following, a process procedure in the image forming apparatus 10 for managing a session between the image forming apparatus 10 and the terminal 20 is described. The image forming apparatus 10 of this embodiment performs session management by using the cookie function.

Figure 7:
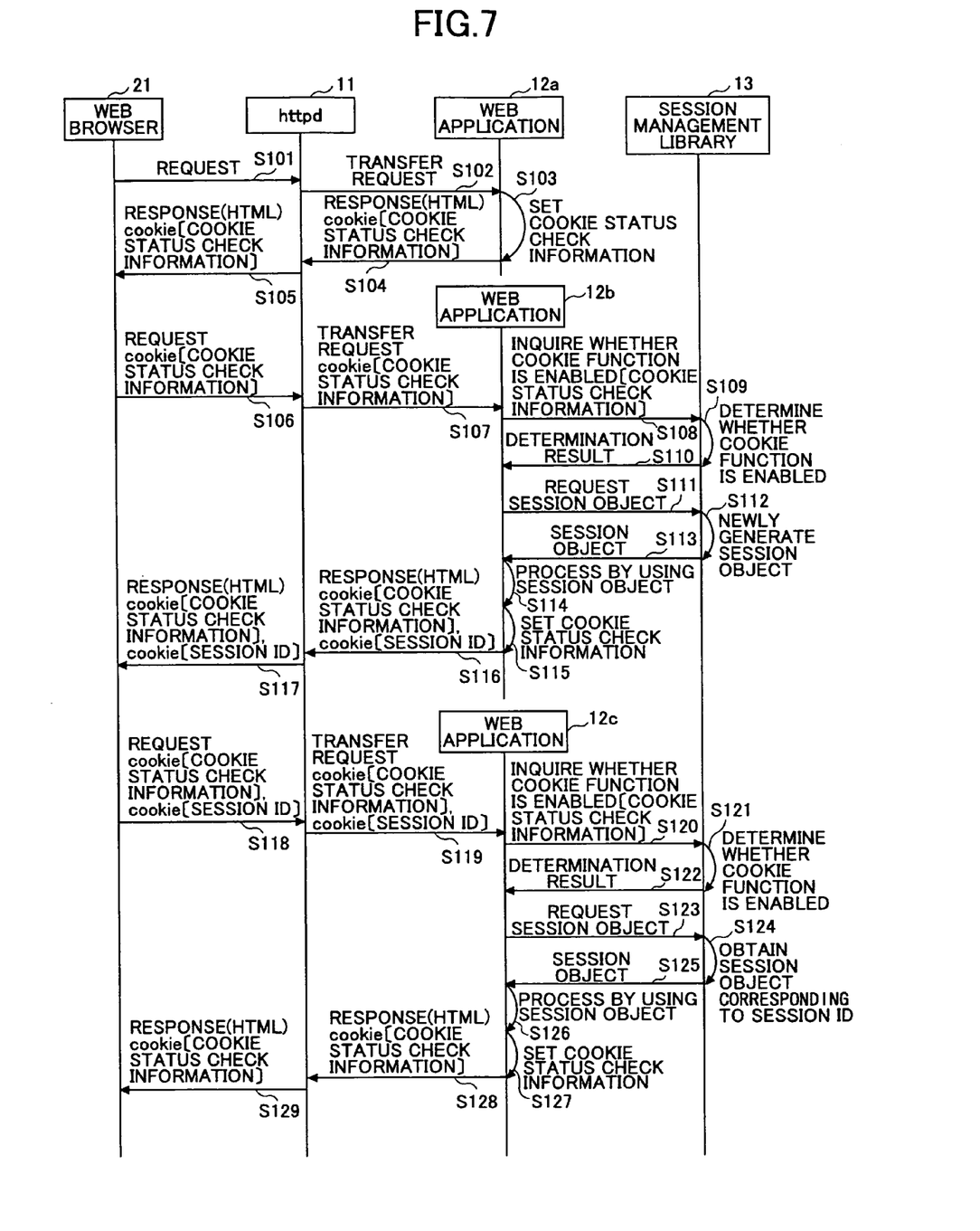
FIG. 7 is a sequence chart for explaining a procedure of session management performed by the Web server in a case where a cookie function is enabled in the terminal according to a first embodiment of the present invention.

FIG. 7 is a sequence chart for explaining the procedure for session management in the Web server in a case where the cookie function is enabled in the terminal according to a first embodiment.

In step S101, the Web browser 21 of the terminal 20 sends an HTTP request (to be referred to as simply "request") for requesting the image forming apparatus 10 to provide a predetermined service. Then, the httpd 11 receives the request, and a Web application 12a corresponding to the request is called in step S102.

In step S103, the Web application 12a generates an HTTP response (to be referred to as simply "response" hereinafter) including a Web page (to be referred to as "login page" hereinafter) for inputting a user ID and a password. At this time, the Web application 12a sets a predetermined string (to be refereed to as "cookie status check information" hereinafter) into a header called "Set-Cookie:" in the response. The cookie status check information is not limited to a particular string. For example, the cookie status check information may be a string "CookieOnOffFlag". In addition, the Web application 12a outputs the generated response to the httpd 11 in steps S104.

In step S105, the httpd 11 sends, to the terminal 20, the response including the login page and the cookie status check information. Then, the Web browser 21 stores the cookie status check information in a predetermined file, and displays a login page.

When the user inputs a user ID and a password on the login page, the Web browser 21 sends a request to the image forming apparatus 10 to perform login in step S106. Since the cookie function is enabled in the terminal 20, the Web browser 21 sets the cookie status check information stored in the header "Cookie:" in the request in step S105.

In step S107, the httpd 11 that receives the request calls the Web application 12b corresponding to the request. For checking whether the cookie function is enabled or not in the terminal 20, the Web application 12b calls the cookie status check function 131 in the session management library 13 by specifying information in the request from the terminal 20 as an argument in step S108. The cookie status check function 131 determines whether the cookie function is enabled by checking whether the request includes the cookie status check information in step S109. Then, the cookie status check function sends the check result to the Web application 12b in step S110.

Then, when the cookie status check information is included in the request, the cookie status check function 131 determines that the cookie function is enabled in the terminal 20. When the cookie status check information is not included in the request, the cookie status check function 131 determines that the cookie function is disabled in the terminal 20.

That is, when the cookie function is enabled in the terminal 20, there is a high probability that the terminal 20 sends back the cookie status check information. When the cookie function is disabled in the terminal 20, there is a low probability that the terminal 20 sends back the cookie status check information.

In step S111, the Web application 12b checks that the cookie function is enabled in the terminal 20, so that the Web application 12b requests the session object obtaining function 132 in the session management library 13 to generate a session object. The session object obtaining function 132 generates the session object (that is, a session is started), and registers a record corresponding to the generated session object in the session management table (that is, keeps a memory area for storing information on the session) in step S112. Further, the session object obtaining function 132 outputs the generated session object to the Web application 12b in step S113.

Figure 8:
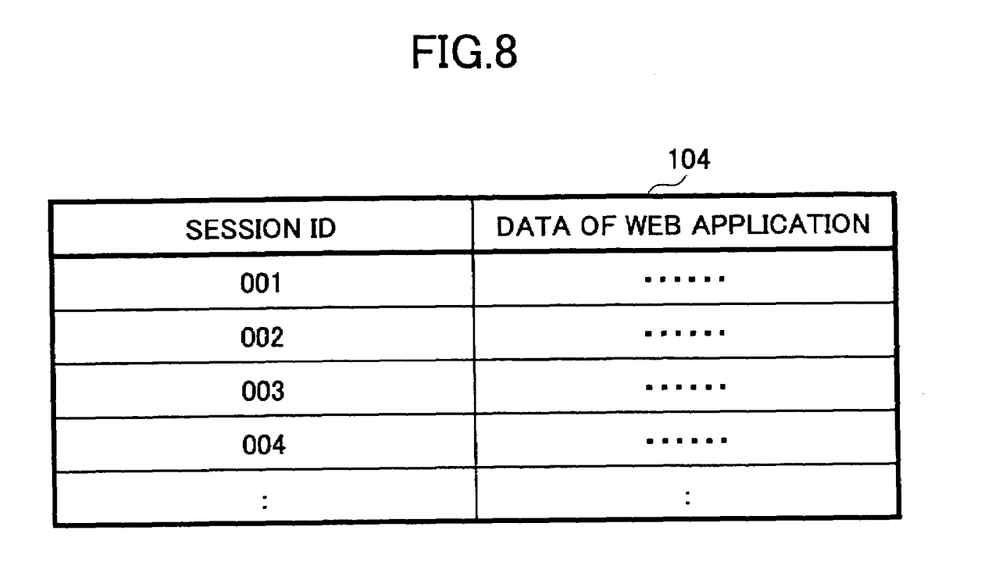
FIG. 8 shows a configuration example of the session management table.

FIG. 8 shows a configuration example of the session management table. As shown in FIG. 8, the session management table 14 is a table for managing the session ID and data of the Web application for each session. The session ID is identification information assigned uniquely to each session object. The data of the Web application is data that is sent by the terminal 20 with a request, and that is temporarily stored by the Web application 14.

In step S114, the Web application 14 performs processes requested by the terminal 20. At this time, the Web application 14 obtains information from the session object and sets information to the session object as necessary by using the Web application setting function 133 and the like.

In step S115, in the same way as the step S103, the Web application 14 generates a response including a Web page, and sets cookie status check information and the session ID into the response as cookie information, and outputs the response to the httpd 11 in step S116.

In step S117, the httpd 11 sends a response to the terminal 20. Then, the Web browser 21 of the terminal 20 stores the cookie status check information and the session ID, and displays the Web page included in the response.

Further, when data is input on the displayed Web page, the Web browser 21 of the terminal 20 sends a request to the image forming apparatus 10 in step S118, in which the request includes the cookie status check information and the session ID stored in step S117.

In step S119, the httpd 11 calls a Web application 12c corresponding to the request. Then, in step S120, the Web application 12c calls the cookie status check function 131 in the session management library 13 in the same way as step S109 so as to check whether the cookie function is enabled or not in the source of the request (terminal 20) (steps S121, S122).

In step S123, when it is checked that the cookie function is enabled in the terminal, the Web application 12c requests the session object obtaining function 132 to obtain a session object corresponding to the session ID included in the request. The session object obtaining function 132 does not generate a new session object this time, but outputs the session object already generated in step S112 to the Web application 12c (steps S124, S125).

In step S126, the Web application 12c performs processes corresponding to the request. Further, the Web application 12c generates a response including the cookie status check information and a Web page as the process result in step S127, and outputs the generated response to the httpd 11 in step S128.

In step S129, the httpd 11 sends the response to the terminal 20. Then, the Web browser 21 of the terminal 20 stores the cookie status check information and displays the Web page included in the response.

After that, although not shown in figures, each time when a request is sent from the terminal 20, processes described in steps S118-S129 are repeated. That is, the cookie status check information and the session ID are exchanged between the terminal 20 and the image forming apparatus 10, so that continuity of a session between the image forming apparatus 10 and the terminal is kept.

Figure 9:
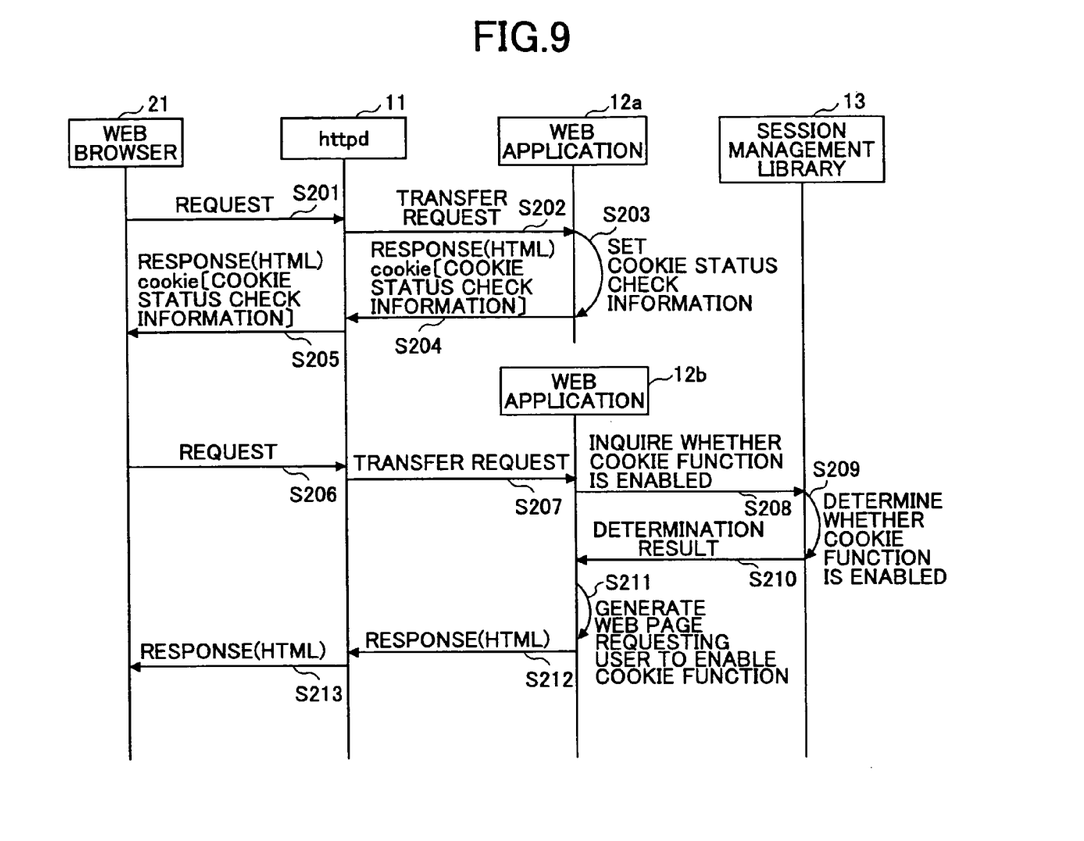
FIG. 9 is a sequence chart for explaining a procedure of session management performed by the Web server in a case where a cookie function is disabled in the terminal according to a first embodiment of the present invention.

Next, a case where the cookie function is disabled in the terminal 20 is described. FIG. 9 is a sequence chart for explaining session management in the Web server when the cookie function is disabled in the terminal according to the first embodiment.

The processes of steps S201-S205 are the same as those of steps S101-S105 in FIG. 7. That is, the image forming apparatus 10 sends a response including the cookie status check information and the login page to the terminal 20. However, in FIG. 9, since the cookie function is disabled in the terminal 20, the cookie status check information included in the response is not stored in the terminal 20 as a cookie.

Therefore, in step S206 corresponding to step S106 in FIG. 7, the request sent by the Web browser 21 to the image forming apparatus 10 does not include the cookie status check information. In step S207, when the httpd 11 that receives the request calls the Web application 12b, the Web application 12b checks whether the cookie function is enabled in the terminal 20 by using the cookie status check function 131 in the session management library 13 in the same way as steps S108-S110 (steps S208-S210).

In step S211, after the Web application 12b checks that the cookie function is disabled in the terminal 20, the Web application 12b generates a Web page (referred to as "cookie use request page") for requesting the terminal 20 to enable a cookie function to the httpd 11 in step S212.

In step S213, when the httpd 11 sends the cookie use request page to the terminal 20, the Web browser 21 displays the cookie use request page.

Figure 10:
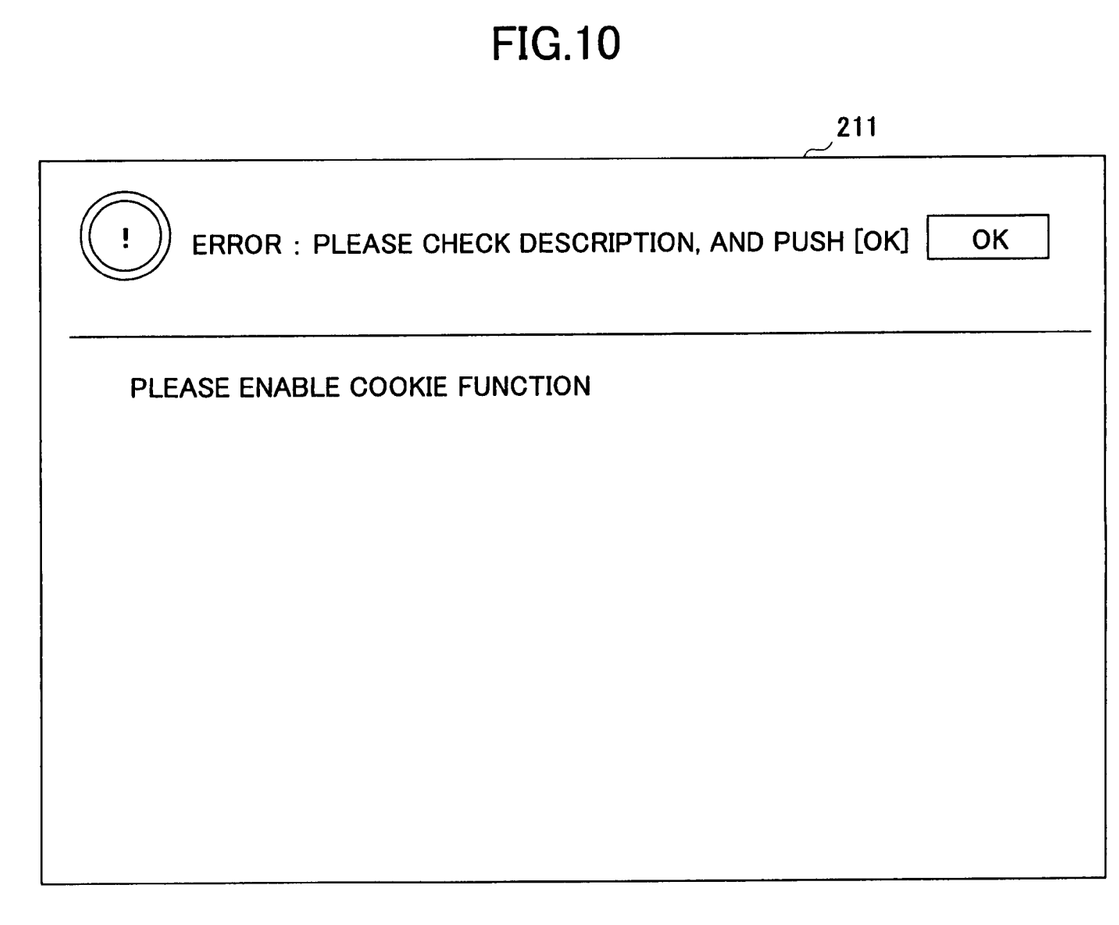
FIG. 10 shows a screen example of a cookie use request page.

FIG. 10 shows a display example of the cookie use request page. As shown in FIG. 10, the cookie use request page 211 includes a message "please enable cookie function". The user of the terminal 20 recognizes that it is necessary to enable the cookie function to access the image forming apparatus 10 by checking the cookie use request page 211.

As mentioned above, according to the image forming apparatus 10 of the first embodiment, the image forming apparatus 10 sends an HTTP response including the cookie status check information in response to an HTTP request from the terminal 20 before a session is started (before a session object is generated). Thus, the image forming apparatus 10 can determine whether the cookie function in the terminal 20 is enabled or not by checking whether an HTTP request sent from the terminal 20 for starting a session includes the cookie status check information.

Therefore, when the cookie function is disabled in the terminal 20, the image forming apparatus 10 does not generate unnecessary session objects so that memory consumption in the image forming apparatus 10 can be decreased.

Next, a second embodiment of the present invention is described. In the second embodiment, instead of the Web application, the httpd 11 sets the cookie status check information into a response. Also in the second embodiment, two cases where the cookie function is disabled and enabled in the terminal 20 are described.

Figure 11:
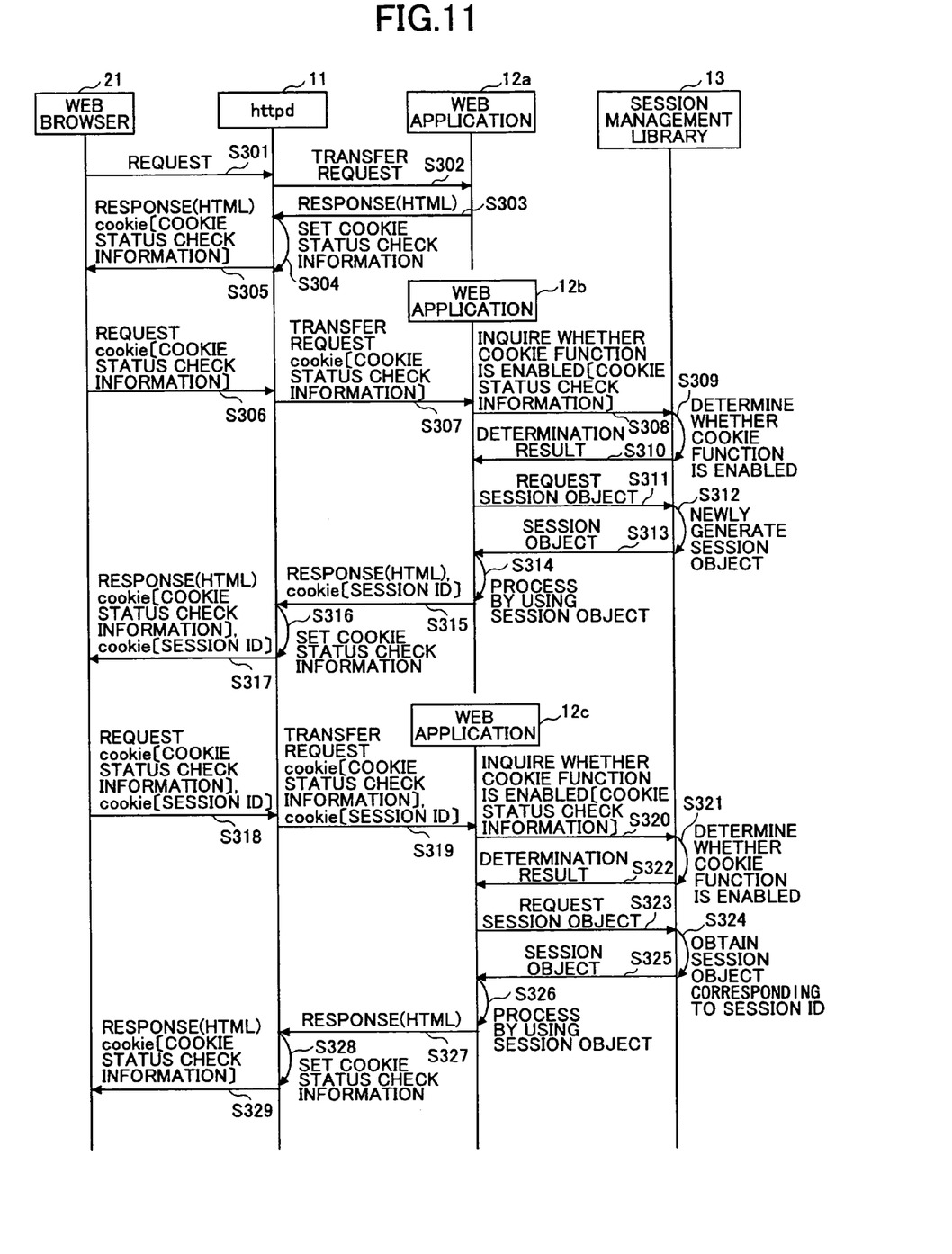
FIG. 11 is a sequence chart for explaining a procedure of session management performed by the Web server in a case where a cookie function is enabled in the terminal according to a second embodiment of the present invention.

FIG. 11 is a sequence chart for explaining a procedure of session management in the Web server according to the second embodiment. The procedure in FIG. 11 is almost the same as that shown in FIG. 7. Thus, only different points are described.

In FIG. 7, each Web application sets the cookie status check information into the header in the response (steps S103, S115, S127). On the other hand, in the case shown in FIG. 11, the httpd 11 performs the processes corresponding to the steps S103, S115 and S127 (steps S304, S316, and S328). However, from the view point of the terminal 20, there is no difference between the methods of FIG. 7 and FIG. 11. Therefore, the request for starting a session from the terminal 20 includes the cookie status check information in the same way as the first embodiment. In addition, in the same way as the first embodiment, the image forming apparatus 10 can keep continuity of a session between the image forming apparatus 10 and the terminal 20.

Figure 12:
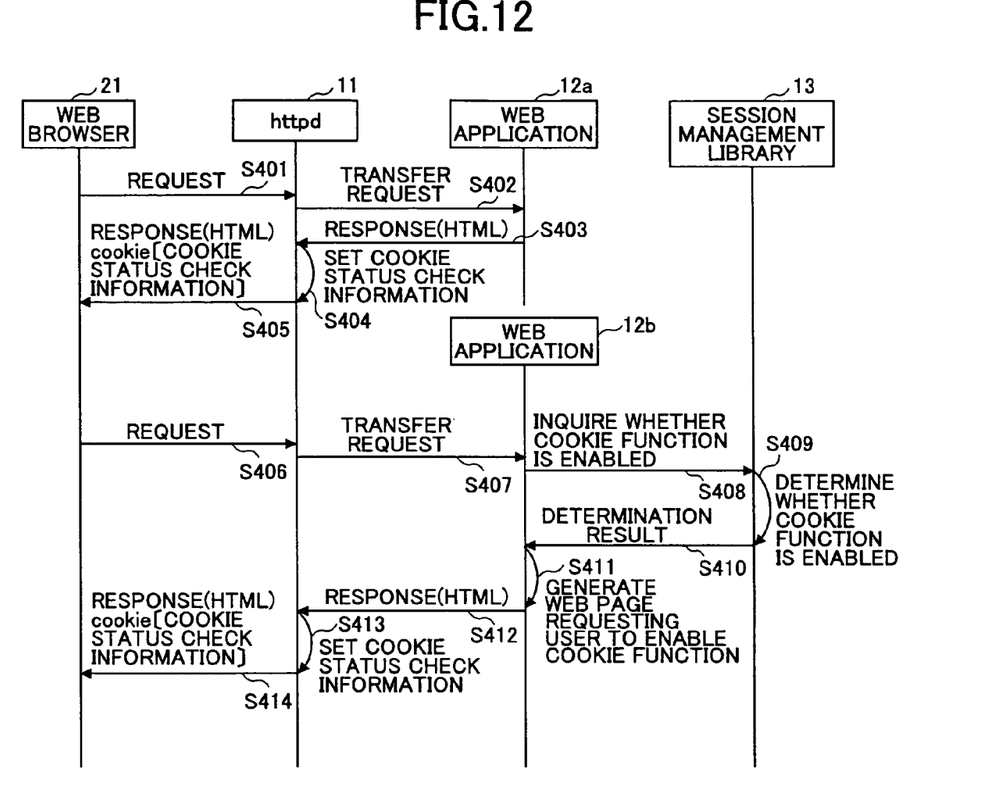
FIG. 12 is a sequence chart for explaining a procedure of session management performed by the Web server in a case where a cookie function is disabled in the terminal according to a second embodiment of the present invention.

Next, a case where the cookie function is disabled in the terminal 20 is described. FIG. 12 is a sequence chart for explaining a procedure of session management in the Web server according to the second embodiment in the case where the cookie function is disabled in the terminal. The procedure in FIG. 12 is almost the same as that shown in FIG. 9. Thus, only different points are described.

The different points between FIG. 12 and FIG. 9 are the same as the different points between FIG. 11 and FIG. 7. That is, in FIG. 9, each Web application sets the cookie status check information into the header in the response (steps S203 and S211). On the other hand, in the case shown in FIG. 12, the httpd 11 performs the processes corresponding to the steps S203 and S211 (steps S404 and S413).

However, from the view point of the terminal 20, there is no difference between the methods of FIG. 9 and FIG. 12. Therefore, in the same way as the first embodiment, the image forming apparatus 10 can determine that the cookie function is disabled in the terminal 20 by checking that the cookie status check information is not included in a request from the terminal 20 for starting a session. Thus, the image forming apparatus 10 can send a cookie use request page 211 to the terminal 20.

As mentioned above, according to the image forming apparatus 10 of the second embodiment, since the httpd 11 sets the cookie status check information into the response from each Web application 12, it is unnecessary to provide the cookie status check information setting function in each Web application 12. Therefore, a work load for a developer who develops a new Web application 12 can be decreased.

Alternatively, each Web application 12 may include a common function for outputting an HTTP response to the httpd 11, in which the common function performs the setting process of the cookie status check information. As a result, effects same as the second embodiment can be obtained.

In addition, although the image forming apparatus 10 is described as an example of the information processing apparatus, by implementing functions of the present invention in a general computer, same effects can be obtained by the computer.

As mentioned above, according to the image forming apparatus 10, the image forming apparatus 10 can determine whether the cookie function is enabled or not in the terminal at the time when a session between the terminal and the image forming apparatus is started.

The present invention is not limited to the specifically disclosed embodiments, and variations and modifications may be made without departing from the scope of the present invention.

The present application contains subject matter related to Japanese patent application No.2003-110540, filed in the JPO on Apr. 15, 2003, the entire contents of which being incorporated herein by reference.

What is claimed is:

1. An information processing apparatus that communicates with a terminal connected to a network by using an HTTP protocol and performs processes requested by the terminal, the information processing apparatus comprising;

a cookie information setting part configured to set, before keeping a memory area for storing information on a session between the terminal and the information processing apparatus, a predetermined string for checking a cookie status of the terminal, as cookie information, in an HTTP response corresponding to a first HTTP request sent from the terminal; and a cookie information determining part configured to determine whether a second HTTP request includes the predetermined string as cookie information, wherein the second HTTP request is sent from the terminal after the first HTTP request is sent and indicates a start of a session between the terminal and the information processing apparatus, wherein, when the cookie information determining part determines that the second HTTP request does not include the predetermined string, the information processing apparatus sends an HTTP response for the second HTTP request without keeping a memory area for storing information on a session between the terminal and the information processing apparatus and without including session identification information identifying the session into the HTTP response, and wherein, when the cookie information determining part determines that the second HTTP request includes the predetermined string, the information processing apparatus keeps the memory area for storing information on a session between the terminal and the information processing apparatus, and sends to the terminal an HTTP response including the session identification information as a response to the second HTTP request.

2. The information processing apparatus as claimed in claim 1, wherein, when the cookie information determining part determines that the second HTTP request does not include the predetermined string, the information processing apparatus sends, to the terminal, a Web page for requesting to enable a cookie function in the terminal as a response to the second HTTP request.

3. The information processing apparatus as claimed in claim 1, wherein the information processing apparatus is an image forming apparatus configured to perform at least one of a printing operation and a facsimile operation in response to a request from the terminal.

4. An information processing apparatus comprising:

a communication control part configured to control communications by using an HTTP protocol between the information processing apparatus and a terminal connected to a network;

a process execution part configured to execute a process corresponding to a first HTTP request from the terminal received by the communication control part;

a cookie information setting part configured to set, before keeping a memory area for storing information on a session between the terminal and the information processing apparatus, a predetermined string for checking a cookie status of the terminal as cookie information in an HTTP response corresponding to the first HTTP request sent from the terminal; and a cookie information determining part configured to determine whether a second HTTP request received from the terminal includes the predetermined string as cookie information, wherein the second HTTP request indicates a start of a session between the information processing apparatus and the terminal, wherein, when the cookie information determining part determines that the second HTTP request does not include the predetermined string, the information processing apparatus sends an HTTP response for the second HTTP request without keeping a memory area for storing information on a session between the terminal and the information processing apparatus and without including session identification information identifying the session into the HTTP response, and wherein, when the cookie information determining part determines that the second HTTP request includes the predetermined string, the information processing apparatus keeps the memory area for storing information on a session between the terminal and the information processing apparatus, and sends to the terminal an HTTP response including the session identification information as a response to the second HTTP request.

5. A session management method used in an information processing apparatus that communicates with a terminal connected to a network by using an HTTP protocol and performs processes requested by the terminal, the session management method comprising:

a cookie information setting step of setting, before keeping a memory area for storing information on a session between the terminal and the information processing apparatus, a predetermined string for checking a cookie status of the terminal, as cookie information, in an HTTP response corresponding to a first HTTP request sent from the terminal; and a cookie information determining step of determining whether a second HTTP request includes the predetermined string as cookie information, wherein the second HTTP request is sent from the terminal after the first HTTP request is sent and indicates a start of a session between the terminal and the information processing apparatus, wherein, when the determining step determines that the second HTTP request does not include the predetermined string, the information processing apparatus sends an HTTP response for the second HTTP request without keeping a memory area for storing information on a session between the terminal and the information processing apparatus and without including session identification information identifying the session into the HTTP response, and wherein, when the determining step determines that the second HTTP request includes the predetermined string, the information processing apparatus keeps the memory area for storing information on a session between the terminal and the information processing apparatus, and sends to the terminal an HTTP response including the session identification information as a response to the second HTTP request.

6. The session management method as claimed in claim 5, wherein, when the information processing apparatus determines that the second HTTP request does not include the predetermined string in the cookie information determining step, the information processing apparatus sends, to the terminal, a Web page for requesting to enable a cookie function in the terminal as a response to the second HTTP request.

7. The session management method as claimed in claim 5, wherein the information processing apparatus is an image forming apparatus configured to perform at least one of a printing operation and a facsimile operation in response to a request from the terminal.

8. The information processing apparatus of claim 4, wherein the information processing apparatus is an image forming apparatus configured to perform at least one of a printing operation and a facsimile operation in response to a request from the terminal.

* * * * *